United States Patent [19]

Perrin

[11] Patent Number: 4,880,440
[45] Date of Patent: Nov. 14, 1989

[54] HOLLOW FIBER MULTIMEMBRANE CELLS AND PERMEATORS

[75] Inventor: Jerry Perrin, Charlestown, Mass.
[73] Assignee: Union Carbide Corporation, Danbury, Conn.
[21] Appl. No.: 242,604
[22] Filed: Sep. 12, 1988
[51] Int. Cl.$^4$ ............................................ B01D 53/22
[52] U.S. Cl. ............................................ 55/16; 55/68; 55/158; 210/500.23
[58] Field of Search ............................ 55/16, 68, 158; 210/321.74, 321.8, 321.83, 321.89, 323.2, 336, 641

[56] References Cited

U.S. PATENT DOCUMENTS

| | | | |
|---|---|---|---|
| 3,339,341 | 9/1967 | Maxwell et al. ........................ | 55/16 |
| 3,342,729 | 9/1967 | Strand ........................ | 210/321.78 X |
| 3,794,468 | 2/1974 | Leonard ........................ | 55/158 X |
| 4,080,296 | 3/1978 | Clark ........................ | 210/500.23 X |
| 4,119,417 | 10/1978 | Heki et al. ........................ | 55/158 |
| 4,140,499 | 2/1979 | Ozaki et al. ........................ | 55/158 |
| 4,207,192 | 6/1980 | Coplan et al. ........................ | 210/321 |
| 4,346,006 | 8/1982 | Kopp et al. ........................ | 210/500.23 X |
| 4,352,736 | 10/1982 | Ukai et al. ........................ | 210/500.23 X |
| 4,430,219 | 2/1984 | Kuzumoto et al. ........................ | 210/500.23 X |
| 4,508,548 | 4/1985 | Manatt ........................ | 55/16 X |
| 4,676,808 | 6/1987 | Coplan ........................ | 55/158 |
| 4,752,305 | 6/1988 | Johnson ........................ | 55/16 |

FOREIGN PATENT DOCUMENTS

| | | | |
|---|---|---|---|
| 1196874 | 11/1985 | Canada ........................ | 210/500.23 |
| 206130 | 12/1986 | European Pat. Off. ........ | 210/500.23 |
| 233946 | 3/1986 | German Democratic Rep. ........................ | 210/500.23 |
| 16922 | 4/1983 | Japan ........................ | 210/500.23 |

OTHER PUBLICATIONS

Ohno et al., J. Nucl. Sci. & Tech., 14, 589 (1977) "Radioactive Rare Gas Separation Using a Separation Cell with Two Kinds of Membrane Differing in Gas Permeability Tendency".
Ohno et al., Radiochem. Radioanal. Letters, 27, 299, (1976), "Separation of Rare Gases by Membranes".
Sirkar, Sep. Sci. & Tech., 15, 1091, (1980), "Asymmetric Permeators—A Conceptual Study".
Stern et al., J. Memb. Sci., 20, 25 (1984), "Recycle and Multimembrane Permeators for Gas Separations".
Sengupta et al., J. Memb. Sci., 21, 73 (1984), "Multicomponent Gas Separation by Assymetric Permeator Containing Two Different Membranes".
Perrin et al., AIChE J., 31, 1167, (1985), "Modeling of Permeators with Two Different Types of Polymer Membranes".
Sengupta et al., AIChE J., 33, 529, (1987), "Ternary Gas Mixture Separation in Two—Membrane Permeators".
Perrin et al., AIChE J., 32, 1889, (1986), "Separation of a Helium—Methane Mixture in Permeators with Two Types of Polymer Membranes".

Primary Examiner—Robert Spitzer
Attorney, Agent, or Firm—Alvin H. Fritschler

[57] ABSTRACT

Two or more different permeable membranes capable of separating different components of a fluid mixture are used to fabricate hollow fiber multicomponent cells and permeator modules.

9 Claims, 3 Drawing Sheets

HOLLOW FIBER MULTIMEMBRANE CELLS AND PERMEATORS

FIELD OF THE INVENTION

This invention relates to hollow fiber unified multimembrane permeator modules containing at least two different permeable membranes in a unified multimembrane permeation cell. Each permeable membrane in the unified multimembrane permeation cell is capable of simultaneously separating a different component from a fluid feed mixture for the recovery of individual permeate streams each enriched in a specific component, which may be the same or different, of the fluid feed mixture and generation of an unpermeated raffinate stream diminished in concentration of the component or components comprising the permeate streams. This invention is particularly concerned with the methods for producing the hollow fiber unified multimembrane cells, the unified multimembrane permeator modules, and their uses.

BACKGROUND

Within the past few decades the use of membranes in fluid separations has developed to a considerable degree. In this technology permeable membranes capable of selectively separating one or more components from a feed mixture of at least two materials, either liquid or gas, have been used to construct the permeators or modules which house the membranes. Initially the permeators were of relatively simple construction and used a single selective membrane to recover two streams, a permeate stream and a raffinate stream, from the feed. In most instances the permeable membrane chosen was one which would provide an enriched permeate stream of the desired component while the raffinate stream had a diminished content of the permeated component. However, one could have a system in which the reverse was true. These systems have a single permeable membrane capable of separating a component from other components in the feed. The single membrane permeators permitted recovery of only two separate streams. Such permeators are exemplified in U.S. Pat. Nos. 3,133,132 issued May 12, 1964 to S. Loeb et al., 3,442,002 issue May 6, 1969 to J. E. Geary, Jr. et al., 3,794,468 issued Feb., 26, 1974 to R. J. Leonard, 4,207,192 issued June 10, 1980 to M. J. Coplan et al., No. 4,430,219 issued Feb., 7, 1984 to H. Kuzumoto et al., to mention but a few instances.

In the 1970's a new concept was presented, the concept of using two, generally different, permeable membranes in a permeator system for use in processes in which more than two components or product streams were to be recovered. This concept has led to several modifications. In one concept the permeators were connected in series with a different permeable membrane in each permeator, as exemplified in U.S. Pat. No. 4,140,499 issued to Ozaki et al. on Feb., 20, 1979, which also provided for the recycle of a portion of the component from at least one of the streams from a subsequent permeator to a previous permeator in the series. In another modification a cascade system was described wherein a greater multiplicity of permeators and recycles was employed, as exemplified in U.S. Pat. No. 4,119,417 issued to Heki et al. on Oct. 10, 1978.In both the Ozaki et al. and Heki et al. systems described, each permeator cell contained but a single permeable membrane in the individual permeator cell or cartridge.

These modifications led to a still further modification wherein each permeator cell contained two different types of permeable membranes, each membrane of different permeability characteristics being selectively permeable by a different fluid component originally present in the feed mixture and each permeable membrane being separately constructed as a distinct unit. These permeator cells or systems are now known as multimembrane permeators; they are permeator cells constructed of two different permeable membranes each capable of separating different components from a feed mixture, the two membranes being present in the single permeator cell. In the multimembrane permeators the feed is simultaneously contacted with different membranes and one recovers two separate permeate streams, a first stream enriched in a first component and a second stream enriched in a second component. Illustratively, a single multimembrane permeator cell in a permeator module can be used to separate or enrich the components from a multicomponent feed mixture; it must be accepted that the permeable membranes employed have the selective properties needed to achieve the desired separations. In the typical operation there is enrichment, not complete separation of specific gases.

One of the major problems with multimembrane permeator modules has been the commercial construction of satisfactory unified multimembrane permeation cells and until this date they have been difficult to produce. Though several procedures have been published none have been commercially practical.

In an article by Ohno et al., J. Nucl. Sci. & Tech., 14, 589 (1977), two membrane permeators are disclosed in which the separation cell contains two different kinds of permeable membranes, as shown in FIG. 7 of the article. Each permeable membrane cell unit, however, is separately constructed and contains only a single permeable membrane. Thus there is one membrane unit that has a porous membrane and another membrane unit that has a nonporous membrane, the two membranes differing in gas permeability. The two different permeable membrane units are then used to construct the described two membrane permeator and a multiplicity of the two-membrane permeators is used in a cascade system to separate gas mixtures. The two membrane permeators or cascades of the two-membrane permeators described by Ohno et al. were usually used to provide a superior separation factor for a single component that was present in the feed mixture. Ohno et al. did not consider recovery of two separate enriched permeates, each of a different component, they were concerned with the separation of krypton from a nitrogen-krypton mixture. Further, nowhere in the article do the authors suggest or disclose co winding two or more permeable membranes to form a unified multimembrane permeation cell as hereinafter defined and the use of this unified multimembrane permeation cell to make a unified multimembrane permeator module as hereinafter defined. Separate membrane units each having a different permeable membrane were prepared and then sets of these were used to make their described two-membrane permeator.

U.S. Pat. No. 4,119,417 and U S. Pat. No. 4,140,499, supra, mention separation cells having two kinds of membranes (col. 1, lines 18–19). In both instances, they use the term separation cell to refer to the two celled permeator unit of FIG. 2 in which each cell contains a single different permeable membrane. In the methods disclosed, a plurality of two celled separating units is used in a multi-stage series, and a two-celled unit comprising a first separating cell provided with a membrane and a second separating cell generally provided with a different membrane is employed. The series arrangements are used for gas separating. The patents make no reference to unified multimembrane permeation cells in which two different permeable membranes are co-wound to form the unified multimembrane permeation cell, or the unified multimembrane permeator module of this invention.

Ohno et al., "Separation of Rare Gases By Membranes", Radiochem. Radioanal. Letters, 27, 299 (1976), was an early disclosure of a new separation cell which had two compartments, each compartment having different separation functions attained by the use of different membranes in each compartment. There is no suggestion of the unified multimembrane permeation cell of this invention with the two different hollow fiber permeable membranes wound together in a single unified multimembrane permeation cell.

Sirkar in "Asymmetric Permeators - A Conceptual Study", Sep. Sci. & Tech. 15, 1091 (1980), studied the permeator concept of Ohno et al. in multicomponent gas separations and the various applications in which the Ohno et al. permeators could be used. Among the systems referred to are those in which different membranes are connected to the opposite tube sheets in the configuration shown by his FIG. 2. Other possibilities discussed are hollow fibers of different membranes evenly dispersed amongst each other instead of each type being bundled separately. He states one could make the lengths of the hollow fibers of one material such that they get sealed in the tubesheet meant for the other membrane material. However, he gives no indication how these structures can be produced. Another possible arrangement disclosed by Sirkar is a stack of parallel membranes of differing permeability with suitable spacers in between to provide chambers as shown in FIG. 3.

Stern et al. "Recycle and Multimembrane Permeators for Gas Separations" J. Memb. Sci., 20, 25 (1984), reviewed the use of different membranes in different permeator configurations for gas separations. In their study each permeator cell contained a different type of permeable membrane; they did not use permeators in which two or more different membranes were wound to produce a unified multimembrane permeation cell as hereinafter defined in this invention. Permeators discussed by Stern et al. were then considered in various arrangements, in series, in parallel, and in the same vessel, as shown in their FIG. 10, and their conclusion was that best results would be achieved when the two different permeable membranes were contained in the same vessel or permeator module. However, in no instance did they disclose or suggest a permeator containing two or more different membranes wound together to form the unified multimembrane permeation cell of this invention.

The use of multiple membrane permeators to separate multicomponent gas mixtures into three product streams using two different membranes preferentially selective to two different components of the mixture was studied by Sengupta et al., "Multicomponent Gas Separation By An Asymmetric Permeator Containing Two Separate Membranes", J. Memb. Sci., 21, 73 (1984). This study involves different flow patterns and mathematical equations were formulated; but, nowhere did it discuss the method used for constructing the multiple membrane permeators.

Perrin et al., "Modeling of Permeators with Two Different Types of Polymer Membranes", AIChE J., 31,1167 (1985), discuss flow patterns and develop mathematical models for gas separations in which two types of membranes are enclosed in the same permeator module. The systems they employed did not intersperse two membranes, each membrane was maintained apart from the other even though the two membrane units may be enclosed in the same vessel or permeator module. Perrin et al. nowhere disclose how to construct the units.

Sengupta et al. "Ternary Gas Mixture Separation In Two-Membrane Permeators" AIChE J., 33,529 (1987), studied the single stage separation of multicomponent gas mixtures in a hollow fiber permeator module which simultaneously housed two different types of permeable membranes, cellulose acetate and silicone rubber, to separate the feed into three streams, two permeates and one reject, each stream enriched in a different component. In the permeator disclosed the two permeable membranes were potted, or housed, together inside a shell or module with the ends separated from each other so that the permeates could be collected individually, as shown in FIG. 2. The reference does not suggest or disclose a unit in which two different permeable membranes are wound together to form the unified multimembrane permeation cell of this invention.

In "Separation of a Helium Methane Mixture in Permeators with Two Types of Polymer Membranes", Perrin et al., AIChE J., 32,1889 (1986), disclosed and used two-membrane permeators. In the first column and in Table 1 on page 1891, six different permeator modules evaluated were discussed, three permeator modules were constructed solely of silicone rubber and three solely of cellulose triacetate. In the second column and in Table 2 on page 1891 permeator modules that enclosed two different types of permeable membranes intermixed with each other are discussed and their structure is shown in FIG. 2. The authors state, and FIG. 2 shows, that in the construction of the two membrane permeator one of the tubesheets, or headers, was provided with dual outlets for two permeate product streams instead of a single stream. The authors say construction was similar to a single-membrane permeator but in the reference specifically lacking is any suggestion or disclosure of a unified multimembrane permeation cell of this invention with outlet for one membrane in one tubesheet and for the other membrane in a second tubesheet or of the method for its construction.

U.S. Pat. No. 4,207,192, issued on June 10, 1980 to M. J. Coplan et al., discloses methods for fabricating hollow filament separatory cells and modules from a single type of permeable membrane. The patent teaches that modules may be constructed wherein either one end or both ends of the bore can be opened. However, at no time is there any suggestion or disclosure of fabricating a unified multimembrane permeation cell or of a unified multimembrane permeator module having two or more different permeable membranes in the cell as disclosed in this invention, nor of any method for achieving this.

None of the references contain any suggestion or disclosure of a unified multimembrane permeation cell or of a method for producing a unified multimembrane permeation cell or unified multimembrane permeator module as hereinafter defined containing two or more permeable membranes in the unified multimembrane permeation cell.

SUMMARY OF THE INVENTION

A method for producing hollow fiber unified multimembrane permeation cells, hollow fiber unified multimembrane permeator modules containing said cells, processes for separating components in a multicomponent mixture from each other using said cells, and said permeators, and said cells per se. In the method two or more different permeable membranes are used to fabricate said unified multimembrane permeation cell, in which each permeable membrane separates a different component from a multicomponent fluid mixture for the recovery of separate fluid permeate streams from each permeable membrane, each permeate stream enriched in at least one of the materials originally present in the feed stream and an unpermeated raffinate stream diminished in concentrations of the enriched materials comprising the permeate streams. The unified multicomponent permeable cells of this invention are produced by a continuous process whereby the different types of hollow fibers are interwoven or interlayered one with the other and the hollow fibers have close contact with each other.

THE DRAWINGS

FIG. 1 illustrates the fabrication of a unified multimembrane permeation cell containing two different types of permeable hollow fibers using a single lead screw.

Figure 1A:
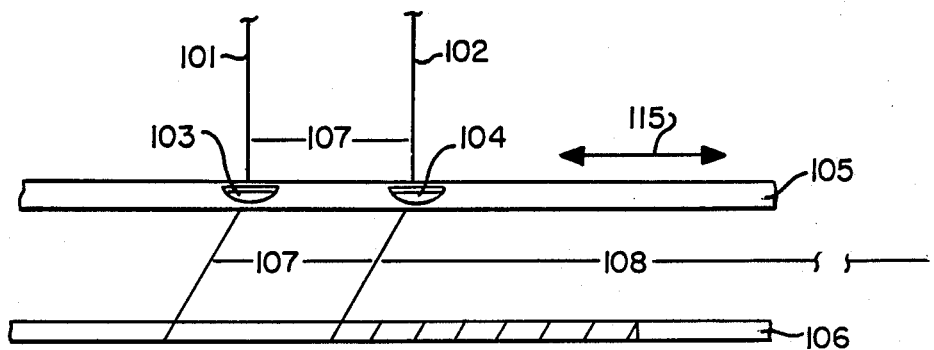
FIG. 1A shows the fabrication at the start of the winding of the hollow fiber permeable membranes and FIG. 1B shows the fabrication at the finish of the winding procedure.

The drawings are not to scale with one another. In addition, the reduction in size of the end portions in FIG. 1B, FIG. 2 and FIG. 4 has been exaggerated for the purpose of explanation. The ends are not necessarily so shaped and can be up to essentially the same size or greater than the body of the unified multicomponent permeation cell. This can be readily accomplished by conventional winding procedures by building up the stub ends of the cell with filament and/or other material, e.g. a monofilament, during the winding process so that the cell has essentially the same diameter from one end to the other.

DESCRIPTION OF THE INVENTION

In accordance with this invention unified multimembrane permeation cells are produced that are fabricated from two or more hollow fiber permeable membranes, preferably different hollow fiber permeable membranes each capable of separating a different component from a fluid mixture. The unified multimembrane permeation cells are used to fabricate unified multimembrane permeator modules which are used to recover separate fluid permeate streams from each permeable membrane, each stream enriched in a specific material of the feed stream, and an unpermeated raffinate stream diminished in the concentrations of the enriched materials in the permeate streams.

The term "component" as used in the Summary and in other portions of this document means an individual compound or material that was originally present in the feed mixture, or a mixture of compounds or materials in which one or more of the compounds or materials originally present in the feed mixture is now present in an enriched state; that is, it is present in the permeate stream or the raffinate stream at a concentration higher than its original concentration in the feed stream.

Throughout this document the term "unified multimembrane permeation cell" means a permeable membrane unit comprised of two or more different hollow fiber permeable membranes in essentially intimate contact with each other, e.g., intertwined, interwoven, interlayered; it also includes those units in which a portion of the hollow fiber permeable membranes is replaced with solid fibers and/or nonpermeable hollow fibers or capillaries for the fluid's components for modifications in shape, spacing and/or fluid flow; these units may also be called "multimembrane cells".

The term "unified multimembrane permeator module" means a unit comprising the unified multimembrane permeation cell and a housing, the unit being equipped with all the required equipment means and openings for feeding a fluid mixture and recovery of permeates and raffinate; these units may also be called "multimembrane permeators". The construction of gas separation cells or units containing permeable membranes is well-known to those of ordinary skill in the art and is fully described in the published literature, e.g., U.S. Pat. No. 4,207,192, supra.

The hollow fiber unified multimembrane permeation cells of this invention are preferably produced by winding two or more different hollow fibers on a shaft and building an annular bundle. The procedure for winding a single type of hollow fiber to form a permeable membrane cell in the form of an annular bundle for recovery of a single permeate stream and a single raffinate stream has been disclosed in U.S. Pat. Nos. 3,422,008, 3,794,468 and 4,207,192. However, these patents neither disclose nor suggest the possibility that one could produce a unified multimembrane permeation cell containing two or more different types of hollow fibers to form an annular bundle or to form a bundle that would be capable of recovering a multiplicity of permeate streams, or any method for producing any of such bundles.

In a preferred method of fabricating a unified multimembrane permeation cell of this invention alternate courses of two different types of hollow fiber permeable membranes are continuously wound on a rotating shaft in helical fashion to form an annular bundle having alternating courses of the two permeable membranes. In one particular mode they are simultaneously wound. The helical winding is performed in a manner, hereinafter more fully described, that after the stub ends of the annular bundle are embedded in tubesheets and sliced to open the bores of the hollow fiber, one potted end of said unified multimembrane permeation cell will have open bores of only the first of the hollow fiber permeable membranes used and the opposite other potted end of said unified multimembrane permeation cell will have open bores of only the second of the hollow fiber permeable membranes used. In this manner, each end of the unified multimembrane permeation cell will permit recovery of a different permeate stream from the original feed stream, a first and a second permeate stream.

The manner of carrying out the process of this invention to produce the novel unified multimembrane permeation cells of this invention is best understood by reference to FIG. 1, which employs equipment similar to that which was used in U.S. Pat. No. 4,207,192 but modified to achieve the goals of this invention.

Figure 1B:
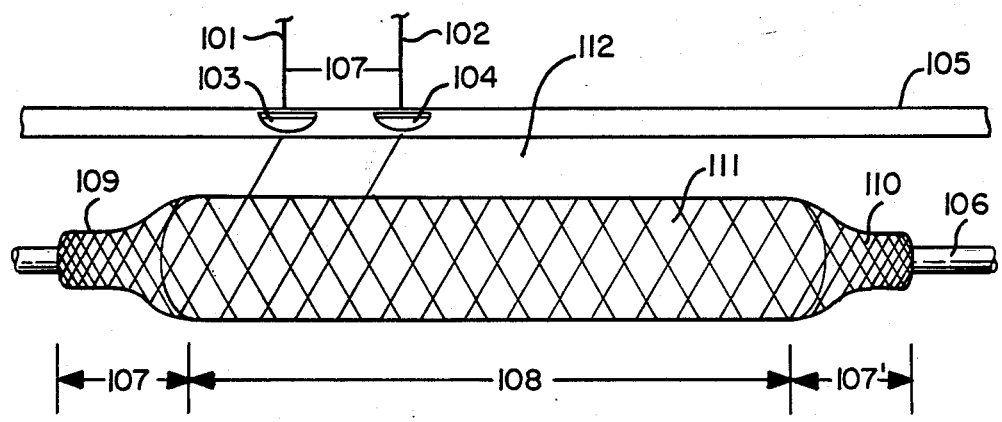

Referring to FIG. 1, FIG. 1A shows the start of the fabrication of a unified multimembrane permeation cell and FIG. 1B shows a completed unified multimembrane cell; the equipment used in the process is commercially available and is not shown in the drawings but was modified as hereinafter described to permit winding of two or more different types of fibers. In FIG. 1 there is shown only that portion of the winding equipment that has been modified, namely the lead screw and the guides. In the conventional and known procedures for fabricating annular permeator cells only a single guide is used; in the method of this invention a multiplicity of guides is used, preferably, one for each type of fiber being wound.

FIG. 1A shows the beginning of the fabrication of a unified multimembrane permeation cell 112. The two different types of hollow fiber permeable membranes 101 and 102, either as individual strands or as a collection of a multiplicity of strands of the fibers, are fed from storage spools, not shown, to guides 103 and 104 that travel in lead screw 105 along axial path 115 shown by the directional arrow. Guides 103 and 104 are positioned in lead screw 105 at a predetermined distance 107 from each other so that hollow fiber permeable membrane 101 will wind in a helix onto a rotating mandrel 106 to a point farther to the left on mandrel 106 than would hollow fiber permeable membrane 102 by the distance 107; hollow fiber permeable membrane 102 will wind in a helix onto a rotating mandrel 106 at a point farther to the right on mandrel 106 than would hollow fiber permeable membrane 101 by the same distance 107', and at intermediate points along distance 108 both hollow fiber permeable membranes 101 and 102 will wind in alternating helices on mandrel 106. Distances 107 and 107' are generally essentially the same in said cell. Any length can be selected sufficient that after potting and slicing the slicing operation at each tubesheet end does not cut into both permeable membranes. In the interest of economy, this distance should be kept at the minimum possible. This helical winding continues in the back and forth axial path shown by the directional arrow 115 until the desired amount of winding has been achieved and a unified multimembrane permeation cell of this invention is fabricated having alternating helical layers or courses of 101 and 102 along distance 108, helical windings of 101 only in distance 107 at the left side of the cell and helical windings of 102 only in distance 107' at the right side of the cell. As is apparent from this discussion, FIG. 1A shows only a portion of the left side of the apparatus and of the unified multimembrane permeation cell undergoing fabrication.

FIG. 1B schematically illustrates the shape of the unified multimembrane permeation cell 112 at the completion of the helical winding process described for FIG. 1A. In FIG. 1B the same numerical designations apply and this FIG. also shows stub end 109 containing only hollow fiber permeable membrane 101, stub end 110 containing only hollow fiber permeable membrane 102, and body 111 containing alternate helically wound layers of both 101 and 102. The configuration of the stub ends has been exaggerated as previously stated.

The two ends of unified multimembrane permeation cell 112 are then potted in conventional manner and the tubesheets are severed or sliced to open the bores. One can choose to pot only stub ends 109 and 110 or one can choose to extend the tubesheet at one or both ends into body 111 for additional support. Whichever procedure is followed, however, slicing of the stub ends 109 and 110 never intrudes into body 111. To do so would result in contamination of the permeate streams recovered with unwanted components.

Figure 2:
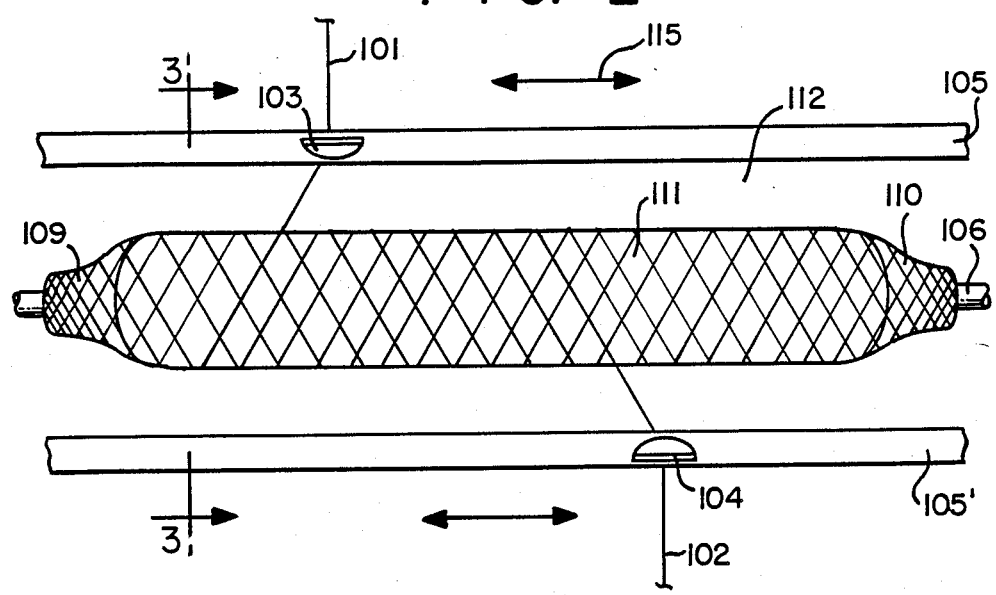
FIG. 2 illustrates the fabrication of a unified multimembrane permeation cell containing two different types of hollow fibers using two lead screws.

FIG. 2 shows another embodiment for producing the unified multimembrane permeation cell 112 in which two lead screws 105 and 105' are used for the winding process, each lead screw carrying a separate guide, 103 and 104, respectively, being selectively distanced one from the other. The same objective is attained but with more control since the angle of winding, tension on the fiber and other parameters can be individually controlled for each of hollow fiber permeable membranes 101 and 102.

Figure 3:
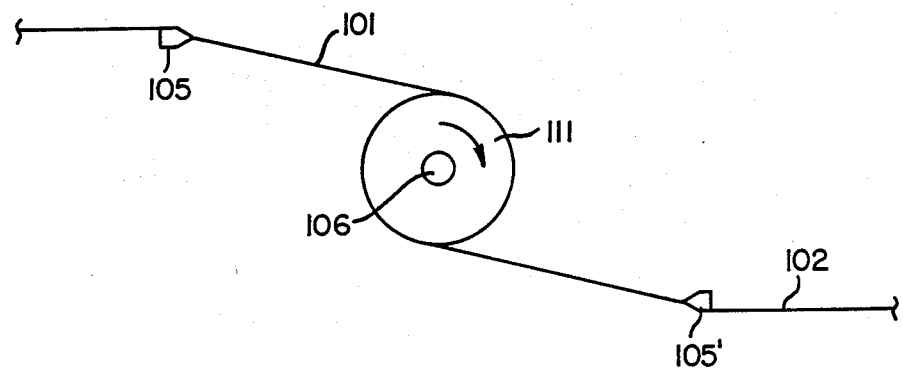
FIG. 3 is a cross sectional view of FIG. 2 showing one possible arrangement of the lead screws.

FIG. 3 is a cross-sectional view of FIG. 2 along plane 3—3. It shows only one of the possibilities of locating lead screws 105 and 105'. The lead screws can be located at any desired position around the circumference of mandrel 106 and body 111.

Figure 4:
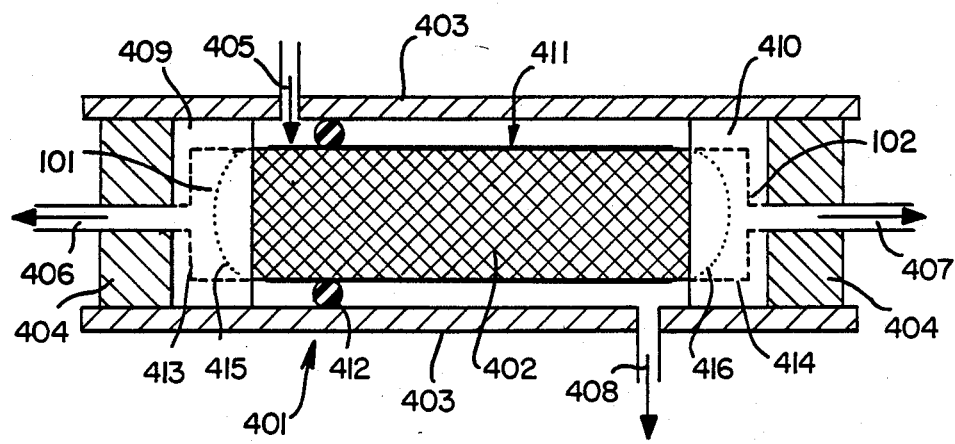
FIG. 4 is a schematic representation of a unified multimembrane permeator module fabricated with a unified multimembrane permeation cell containing two different types of hollow fibers.

FIG. 4 is a representative drawing of one type of unified multimembrane permeator module 401 with unified multimembrane permeation cell 402 supported on a mandrel and encased in cylindrical body 403 fitted with end-capping means 404, feed inlet 405, permeate exit means 406 for hollow fiber permeable membrane 101 permeate product stream, permeate exit means 407 for hollow fiber permeable membrane 102 permeate product stream, raffinate exit means 408 for non permeate raffinate stream, tubesheets 409 and 410, gas barrier wrapping 411 which does not extend from pot surface to pot surface but is spaced away from the tubesheets 409 and 410 to permit gas to enter and exit the bundle matrix, and circumferential sealing means 412, e.g., a tight fitting O-ring. Spaced lines 413 indicate the outline of the membrane cell comprising hollow fiber permeable membrane 101 embedded in sliced tubesheet 409 and spaced lines 414 indicate the outline of the membrane cell comprising hollow fiber permeable membrane 102 embedded in sliced tubesheet 410, the two membrane cells being separate loop cells each with open bores and together comprising unified multimembrane cell 402. Dotted line 415 shows the looped end of hollow fiber permeable membrane 102 embedded in tubesheet 409 and dotted line 416 shows the looped end of hollow fiber permeable membrane 101 embedded in tubesheet 410. Again, the shape of the stub ends has been exaggerated in 413 and 414.

In addition to the structure for the unified multimembrane permeator module shown by FIG. 4, the module can have any other construction. For example, it can have the structures similar to those shown in the drawings of U.S. Pat. No. 4,676,808 but containing the unified multimembrane permeation cell of this invention in the casing and engineered and designed to recover separate permeate component streams and the raffinate stream. Those skilled in the art are fully cognizant of the varied module structures that can be constructed and how they are operated, e.g., feeding the fluid mixture into the side of the casing or into the end(s) of the casing of the module in which said cell is situated.

As previously indicated the equipment for producing annular permeable membrane cells is known and has been extensively employed for the fabrication of annular membrane cells containing a single type of hollow fiber permeable membrane. This equipment can be modified by a skilled engineer to permit the simultaneous winding of a multiplicity of different types of fibers, hollow or solid, to form an annular or spherical module by incorporation of the proper screw leads and guides and used to produce the novel unified multimembrane permeation cells of this invention.

In a typical embodiment for the fabrication of a unified multimembrane permeation cell two types of hollow fiber permeable membranes, say Type A and Type B, are used to produce said unified multimembrane cell. The two types of permeable membranes are wound as depicted in FIG. 1 to form an annular cell having alternating layers or courses of Type A and Type B hollow fiber permeable membranes along section 108 of FIG. 1B, Type A hollow fibers in section 107 of FIG. 1B and Type B hollow fibers in section 107' of FIG. 1B. At the completion of winding, the end sections of the unified multimembrane permeation cell are potted to form tubesheets and both tubesheets are severed or sliced to open the bores of Type A hollow fibers at one end of said cell add the bores of Type B hollow fibers at the other end of said cell.

The tubesheets can be formed to embed only the stub end, e.g., 109, shown in FIG. 1B, thus embedding only, say, Type A of the hollow fibers; or, the tubesheet can be formed to embed the stub end, e.g., 109, and a portion of the 108 section so as to embed the Type A hollow fiber in the stub end 109 plus a section containing both Type A and Type B fiber adjacent thereto, as shown, for example in FIG. 4. Either technique can be used, but when slicing the tubesheet to open the hollow fiber bores, the slice at one end should not cut both Type A and Type B hollow fibers.

After slicing, the unified multimembrane permeation cell of this invention is housed to construct the unified multimembrane permeator module employed for the separation of fluids from binary (or more complex) mixtures.

A schematic representation of a unified multimembrane permeator module is shown in FIG. 4. In practice the multicomponent feed mixture to be separated is introduced via feed inlet 405 and brought into contact with unified multimembrane permeation cell 402. The feed flows into the interstitial spaces surrounding permeable membranes 101 and 102 helically wound to form said unified multimembrane permeation cell 402 and a first component selectively permeates permeable membrane 101 and is recovered via exit means 406, a second component selectively permeates permeable membrane 102 and is recovered via exit means 407, and the nonpermeated raffinate stream is recovered via exit means 408. In this manner two distinct permeate streams are simultaneously recovered and separated from a third raffinate stream.

Fabrication of the unified multimembrane permeation cell using a single lead screw as depicted in FIG. 1B will always require cocurrent feed of the two or more fibers, thus permitting little variation in speed of each fiber. Fabrication using a multiplicity of two or more lead screws as depicted in FIG. 2 (for two lead screws) gives wider selection of operation. The lead screws may be operated to allow for cocurrent or countercurrent movement of the guides permitting a wider range of wind patterns. Separate lead screws also make it possible to wind each type of fiber at a different angle, tension, speed, etc. As a result the unified multimembrane permeation cell of this invention can be constructed with more membrane area of one type than of the other. This is of importance when the different permeable membrane types used have different relative fluxes.

The winding methods described above are preferred and produce efficient unified multimembrane permeation cells. However, there may be some instances in which a sequential winding procedure may be employed to produce what is herein called a "sequential multimembrane cell" that has a lamellar structure similar to the layers found in an onion in which adjacent layers are different from each other. These sequential cells consist of alternating multiple layers of at least two different types of fibers. They are produced by initially forming a multilayer annulus of desired thickness of a first type of hollow fiber permeable membrane using one of the guides shown in FIG. 1 or FIG. 2 and then applying over said initial desired thickness a multilayer of second desired thickness of a second type of hollow fiber permeable membrane using one of the guides shown in FIG. 1 or FIG. 2. This alternating or sequential layering can continue until a module of wanted diameter is obtained with each stub end 109 and 110 having only one type of hollow fiber permeable membrane. This sequential method of fabrication is not considered as beneficial as the previously described method of fabrication but the membrane cells produced are considered within the scope of this invention and can be considered modified unified multimembrane permeation cells.

Both said previously described method and the sequential method can also be used to produce a membrane cell containing a single permeable membrane in conjunction with a solid fiber or a hollow fiber essentially not permeable to the materials in the feed mixture and the claimed method is considered to include the fabrication of such membranes within its scope.

In some instances the hollow fiber permeable membranes used may constitute materials that permit permeation of the same compounds but at different selectivities, thus permitting the recovery of different "components" from the fluid feed mixture having different concentrations of the same compound in each permeate or raffinate component. For example, in the recovery of helium from a 10% helium/90% methane mixture, one can use a unified multimembrane permeator module containing a unified multimembrane permeation cell constructed from two different hollow fiber permeable membranes to recover two separate component streams each enriched in helium and a raffinate stream diminished in helium; say a first permeate component stream of 50% helium and 50% methane and a second permeate component stream of 90% helium and 10% methane with the raffinate component comprising the residual.

Though the preferred unified multimembrane permeation cells are those produced by the helical winding techniques described above, one can use other methods for their preparation. For example, one can arrange the permeable hollow fibers in a planar position as described in U.S. Pat. No. 3,755,034, issued Aug. 28, 1973, or in Canadian Pat. No. 1,199,280, issued Jan. 14, 1986, or in European Pat. Application No. 183,256 A, and the alternate layers of different hollow fibers to form the unified multimembrane permeation cell of this invention.

Illustrative of combinations of different types of permeable membranes that may be used to produce the unified multimembrane permeation cells of this invention one can mention silicone rubber/ polysulfone, silicone rubber/cellulose acetate, polysulfone/polyimide, and the like, including combinations of rubber polymers with glassy polymers, rubber polymers or glassy polymers with ion exchange membranes, two different membranes of the same generic type each possessing different permeability properties, molecular sieve membranes, immobilized liquid membranes, active transport membranes, etc.

The unified multimembrane cells of this invention may be used to recover separate permeate feeds or components from mixtures containing two or more fluid components such as the following mixtures: reformed natural gas : $H_2$—$CO_2$—CO—$CH_4$—$N_2$; producer gas : $H_2$—$CO_2$—CO—N—hd 2; reformer off-gas : $H_2$—CO—$CO_2$; high—sulphur sour natural gas : $CH_4$—$CO_2$—$H_2S$; post—shift reactor gas : $H_2$—CO—$CO_2$—$N_2$; ammonia purge stream : $H_2$—$N_2$—$CH_4$—Ar; natural gas containing He and $N_2$ : He—$CH_4$—$N_2$; deep sea diving gas : He—$O_2$—$N_2$; $N_2$—$CH_4$; He-13 $CH_4$; $H_2$; $H_2$—$CH_4$; $CO_2$—$CH_4$; $O_2$—$N_2$; etc.

The production of permeable hollow fibers and the materials used for their production are well known. Hollow fibers used are semi-permeable and can be dense wall, porous, asymmetric or composite. Such hollow fibers are readily produced by the procedure described by I. Cabasso, "Hollow Fiber Membranes", Kirk Othmer: Enc. of Chem. Tech., 12, Third Ed., 492–517 (1980) and I. Cabasso, "Membranes", Enc. of Pol. Sc. & Eng., 9, Second Ed., 509–579 (1987), incorporated herein by reference. Many hollow fibers are known to be porous with channels for fluid flow existing between the exterior and interior surfaces of the hollow fibers. The pores generally have an average cross-sectional diameter less than about 200,000 Angstroms and in some porous hollow fibers the average pore cross sectional diameter is less than about 50,000 or about 10,000 Angstroms; in some instances, the average pore cross sectional diameter can be as small as about 5 to about 200 Angstroms. Depending upon the intended use (e.g., gas-gas, liquid-liquid, microfiltration, ultrafiltration, etc.) one selects hollow fibers having the appropriate pore diameter sizes.

Advantageously the walls of the hollow fibers are sufficiently thick so that no special apparatus would be required for their handling. The outside diameter of the hollow fiber can vary from about 1 mil or less to about 100 mils or more, preferably from about 2 mils to about 80 mils. The wall thickness of the hollow fiber can vary from about 0.1 mil to about 12 mils or more, preferably at least about 0.2 mil up to about 20 mils.

Any of the known organic materials can be used for the production of the hollow fibers, such as the natural and synthetic polymers, including their blends and alloys, thermoplastic or thermoset. Typical polymers can be substituted or unsubstituted polymers and may be selected from polysulfones; poly(styrenes), including styrene containing copolymers such as acrylonitrile-styrene copolymers, styrene butadiene copolymers and styrene vinylbenzylhalide copolymers; polycarbonates; cellulosic polymers, such as ethyl cellulose, cellulose acetate; celluloseacetate-butyrate, cellulose propionate, methyl cellulose, etc.; polyamides and polyimides, including aryl polyamides and aryl polyimides; polyethers; poly(arylene oxides) such as poly(phenylene oxide); polyurethanes; polyesters (including polyarylates), such as poly(ethylene terephthalate), poly(alkyl methacrylates), poly(alkyl acrylates), etc.; polysulfides; polymers from monomers having alpha olefinic unsaturation other than mentioned above such as poly(ethylene), poly(propylene), poly(butene-1), poly(4-methyl pentene 1), polyvinyls, e.g., poly(vinyl chloride), poly(vinyl fluoride), poly(vinylidene chloride), poly(vinylidene fluoride), poly(vinyl esters) such as poly(vinyl acetate) and poly(vinyl propionate); polyphosphazines; etc. Also known are the hollow fibers produced from inorganic materials, e.g., ceramics, glass, etc. Both organic and inorganic materials and known to be used to produce hollow fibers.

In many instances the hollow fiber is in the form of a composite membrane with a thin membrane-forming material applied to the surface of the porous hollow fiber. This can be produced by any of the known procedures, e.g., as shown in U.S. Pat. No. 4,230,463 or as shown in U.S. Pat. No. 4,467,001 wherein a solution of the membrane-forming material is applied to deposit a finished dry coating up to about 7,000 Angstroms, preferably from about 500 to about 2,000 Angstroms adhered to the exterior surface of the porous hollow fiber. In some instances, as previously noted, adhesion is promoted by coupling agents and/or chemical treatment.

Typical of the useful membrane forming materials are polymers which can be substituted or unsubstituted. The materials include synthetic rubbers; natural rubbers; relatively high molecular weight and/or high boiling liquids; organic prepolymers; poly(siloxanes); polysilazanes; polyurethanes; poly(epichlorhydrin); polyamines; polyamides; acrylonitrile containing copolymers such as poly($\alpha$-chloroacrylonitrile) copolymers; polyesters (including polylactams and polyarylates), e.g., poly(alkyl acrylates) and poly(alkyl methacrylates), polysuccinates, and alkyd resins; cellulosic polymers; polysulfones; poly(alkylene glycols) such as poly(ethylene glycol), poly(propylene glycol), etc.,; polymers from monomers having $\alpha$-olefinic unsaturation such as poly(olefins), e.g., poly(ethylene), poly(propylene), poly(butadiene), poly (2,3-dichlorobutadiene),poly(chloroprene), poly(styrene) including poly(styrene) copolymers, e.g., styrene-butadiene copolymer, polyvinyls such as poly(vinyl alcohols), poly(vinyl aldehydes) (e g., poly(vinyl formal) and poly(vinyl butyral), poly(vinyl ketones) (e.g. poly(methyl vinyl ketone)), poly(vinyl esters) (e.g., poly(vinyl benzoate)), poly(vinyl halides), poly(vinylidene halides),; fluorinated ethylene copolymers; poly(arylene oxides); polycarbonates; active transport and liquid membranes; and the like, and any interpolymers including block interpolymers containing repeating units from the above, and grafts and blends containing any of the foregoing, and monomers of the above mentioned polymers.

The tubesheets comprise the end portions of the bundle of hollow fibers embedded in a solid potting material. The formation of the tubesheet can be carried out in any suitable manner and such procedures are well known in the art, e.g., U.S. Pat. Nos. 3,339,341, 3,442,389, 3,455,460, 3,690,465 and 4,207,192, all of which are incorporated herein by reference. Generally the potting material is in liquid form when preparing the tubesheet and solidifies to a pressure resistant, leak-free structure.

The potting material can be inorganic or organic or a mixture thereof. The organic resins that solidify on cooling or curing are generally employed, particularly those which will form a strong adhesive bond to the exterior walls of the permeable hollow fibers and exhibit little shrinkage. These materials are well known and fully described in the literature, e.g., U.S. Pat. No. 4,369,605, incorporated herein by reference.

The unified multimembrane permeation cells of this invention are useful to effect separation of any fluid mixture, e.g., gas/gas, gas/liquid, liquid/liquid mixtures, separable by a semipermeable membrane. They are generally fabricated as units referred to herein as unified multimembrane permeator modules, the design and construction of such permeators poses no problem to one of ordinary skill in the art in view of the detailed explanation herein presented. As is known, the modules can be single ended or double ended.

The hollow fiber unified multimembrane permeation cell comprises the spirally wound hollow fibers sealed in a suitable retainer with the ends of the hollow fibers encapsulated in a tubesheet. After the encapsulation, commonly known as potting, the tubesheet is cut or sliced or severed so the bores of the different hollow fibers are opened to allow unobstructed flow. The unified multimembrane permeator modules are constructed to provide a separation of flow of the feed over the external surface of the hollow fibers from any flow of permeates within the bores of the different hollow fibers comprising the unified multimembrane permeation cell thus enabling separation and recovery of the separate multiple permeate streams from the raffinate stream.

Many procedures are known for producing the tubesheet. In a typical procedure a stub end of the unified multimembrane permeation cell shown in the drawings is placed in a mold, the mold is filled with the potting resin composition to the desired depth, and the bundle retained in the resin-filled mold until the resin hardens. Heat may be used, if desired, to assist curing. After the resin has hardened the integral tubesheet is cured at ambient or elevated temperature. After it has cured it is sliced, cut, or severed by conventional means to open the bores of the ends of the hollow fibers. The process is repeated at the other stub end to obtain the unified multimembrane permeation cell of this invention comprising at least two different permeable hollow fibers capable of separating at least two different permeate streams and a raffinate stream from a multi component feed.

What is claimed is:

1. A method for producing a unified multicomponent permeation cell comprising at least two different hollow fiber permeable membranes, which method includes the steps of winding two different hollow fiber permeable membranes along an axial winding path, each hollow fiber permeable membrane being controlled by separate guide means, said hollow fiber permeable membranes being wound in essentially intimate contact with each other to produce said cell having a central body portion and stub ends, said central body portion comprising essentially said different hollow fiber permeable membranes in intimate alternating contact with each other, and said stub ends comprising essentially only one of said hollow fiber permeable membranes separately encapsulating each stub end area in potting medium to form terminal tubesheets and severing said tubesheets to open the bores of the hollow fiber permeable membrane in the stub end encapsulated in its respective tubesheet, wherein said guide means are maintained at a selected distance one from the other along the axial winding path.

2. A method as claimed in claim 1 wherein the separate guide means for each hollow fiber permeable membrane are positioned at a predetermined distance from each other in a single lead screw.

3. A method as claimed in claim 1 wherein the separate guide means for each hollow fiber permeable membrane are separately positioned at a predetermined distance from each other in multiple lead screws.

4. A unified multimembrane permeation cell comprising a multi permeable membrane unit comprised of at least two different hollow fiber permeable membranes wound in essentially intimate contact with each other and having a central body portion and stub ends, said central body portion comprising essentially said different hollow fiber permeable membranes in alternating contact with each other, and said stub ends each comprising essentially one of said hollow fiber permeable membranes.

5. A unified multimembrane permeation cell as claimed in claim 4 wherein each stub end area is encapsulated in a sliced tubesheet and the hollow fiber permeable membrane bores are open to provide fluid flow therethrough.

6. A unified multimembrane permeator module comprising a unified multimembrane permeation cell as claimed in claim 4 enclosed in a housing, said uniform multimembrane permeator module equipped with fluid inlet means, permeate exit means, raffinate exit means and means for mounting said uniform multimembrane cell in said uniform multimembrane permeator module.

7. A process for simultaneously recovering at least two different permeate streams from a multicomponent feed stream, wherein one or more permeate stream is enriched in at least one component of said feed stream and simultaneously recovering an unpermeated raffinate stream diminished in concentrations of the materials comprising the permeate streams, which comprises bringing said multi component feed stream into contact with a unified multimembrane permeation cell claimed in claim 4 and recovering said permeate and raffinate streams.

8. A process as claimed in claim 7 wherein said feed stream is air.

9. A sequential multimembrane cell comprising a multi-permeable membrane unit comprised of at least two different hollow fiber permeable membranes wound in alternating multiple layers and having a central body portion and stub ends, each layer comprised of multilayers of only one of said different hollow fiber permeable membranes and comprising multiple courses thereof, and each layer of one of said different hollow fiber permeable membranes being in contact with at least one layer of a second of said different hollow fiber permeable membranes in the central body portion, said central body portion comprising alternate layers of said different hollow fiber permeable membranes in sequential helical contact with each other, and said stub ends comprising essentially only one of said hollow fiber permeable membranes.

* * * * *